United States Patent [19]

Young et al.

[11] Patent Number: 5,031,489
[45] Date of Patent: Jul. 16, 1991

[54] CONTROL MEANS FOR FASTENER DRIVING DEVICE

[75] Inventors: Alfred Young, Hickory; Fred E. Church, Newton, both of N.C.

[73] Assignee: Design Tool, Inc., Hickory, N.C.

[21] Appl. No.: 362,589

[22] Filed: Jun. 7, 1989

Related U.S. Application Data

[63] Continuation-in-part of Ser. No. 260,239, Oct. 20, 1988.

[51] Int. Cl.⁵ ............................................. B25B 23/04
[52] U.S. Cl. .................................... 81/430; 81/57.37; 227/112
[58] Field of Search .................... 81/430, 57.37; 227/112 X, 136, 7

[56] References Cited

U.S. PATENT DOCUMENTS

| | | |
|---|---|---|
| 2,534,140 | 12/1950 | Moore . |
| 2,973,021 | 2/1961 | Crossen . |
| 2,994,880 | 8/1961 | Willis . |
| 3,247,874 | 4/1966 | MacDonald . |
| 3,587,683 | 6/1971 | Bangerter . |
| 3,875,982 | 4/1975 | Mizu et al. . |
| 3,946,926 | 3/1976 | Willis . |
| 3,958,614 | 5/1976 | Bandera ............... 81/430 |
| 4,114,663 | 9/1978 | Viner . |
| 4,333,367 | 6/1982 | Taffer . |
| 4,462,283 | 7/1984 | Ito ..................... 81/57.37 |

Primary Examiner—Frederick R. Schmidt
Assistant Examiner—Lawrence Cruz
Attorney, Agent, or Firm—Bell, Seltzer Park & Gibson

[57] ABSTRACT

A fastener driving apparatus is disclosed and which includes a fastener driving device into which fasteners are sequentially introduced from a feed assembly. The driving device incorporates a control member which regulates the timing of the introduction of fasteners into the device, and which also limits longitudinal and rotative relative movement between fixed and movable concentric, slotted barrel members of the device. The control member is mounted by a pair of guide tracks, each having abutment surfaces at adjacent ends thereof, for longitudinal movement into and out of engagement with the abutment surfaces and the actuating lever of a control switch.

10 Claims, 3 Drawing Sheets

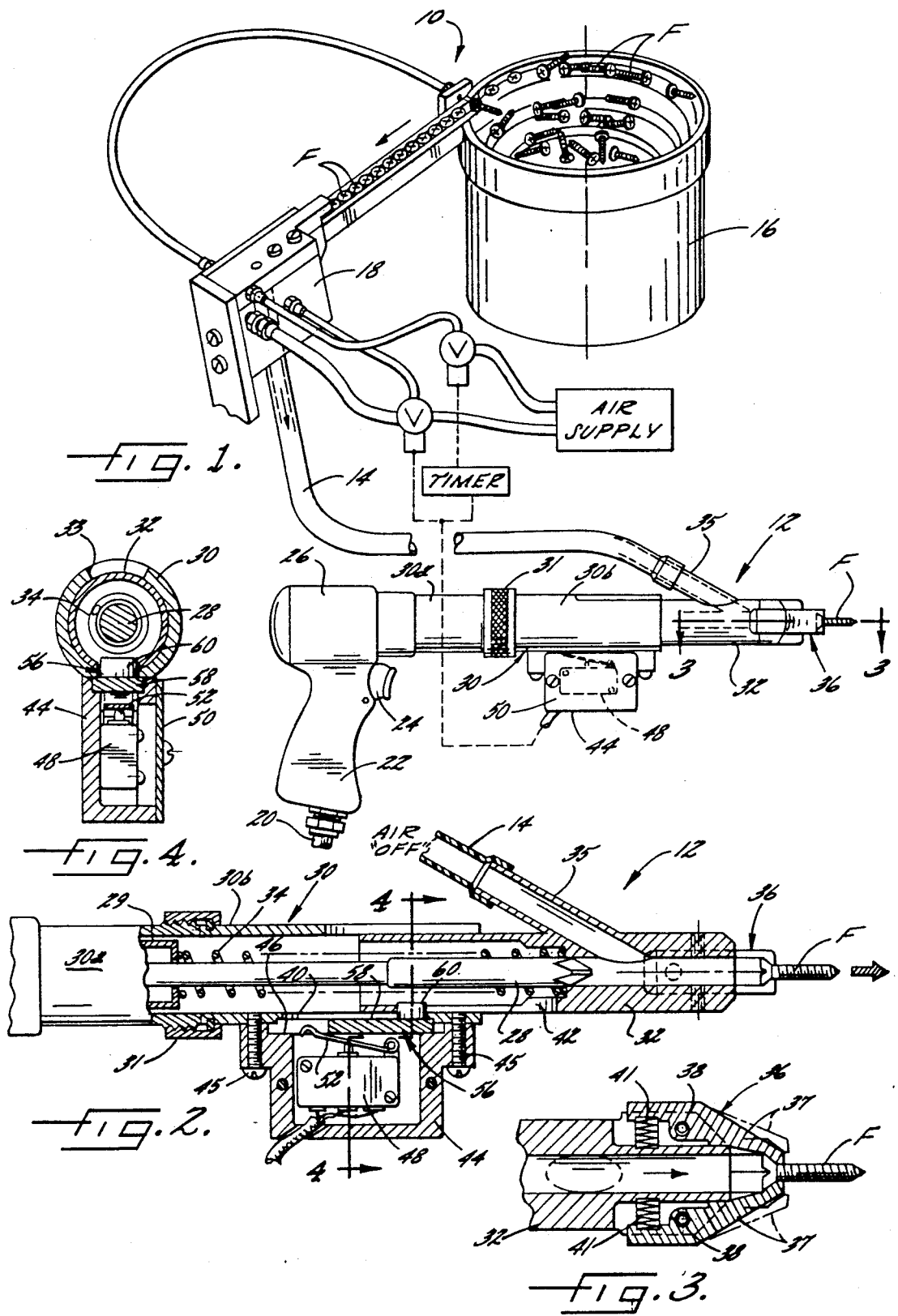

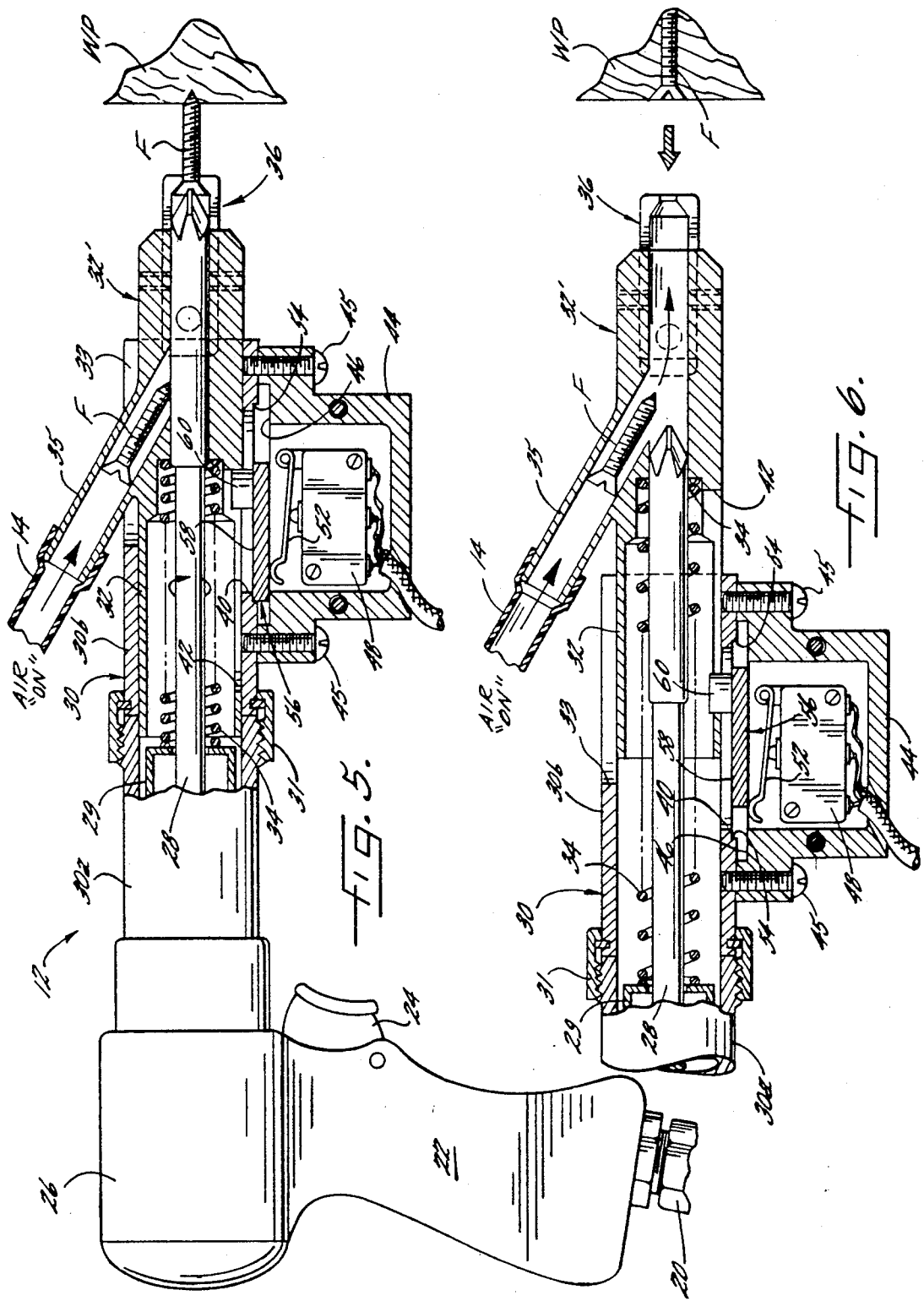

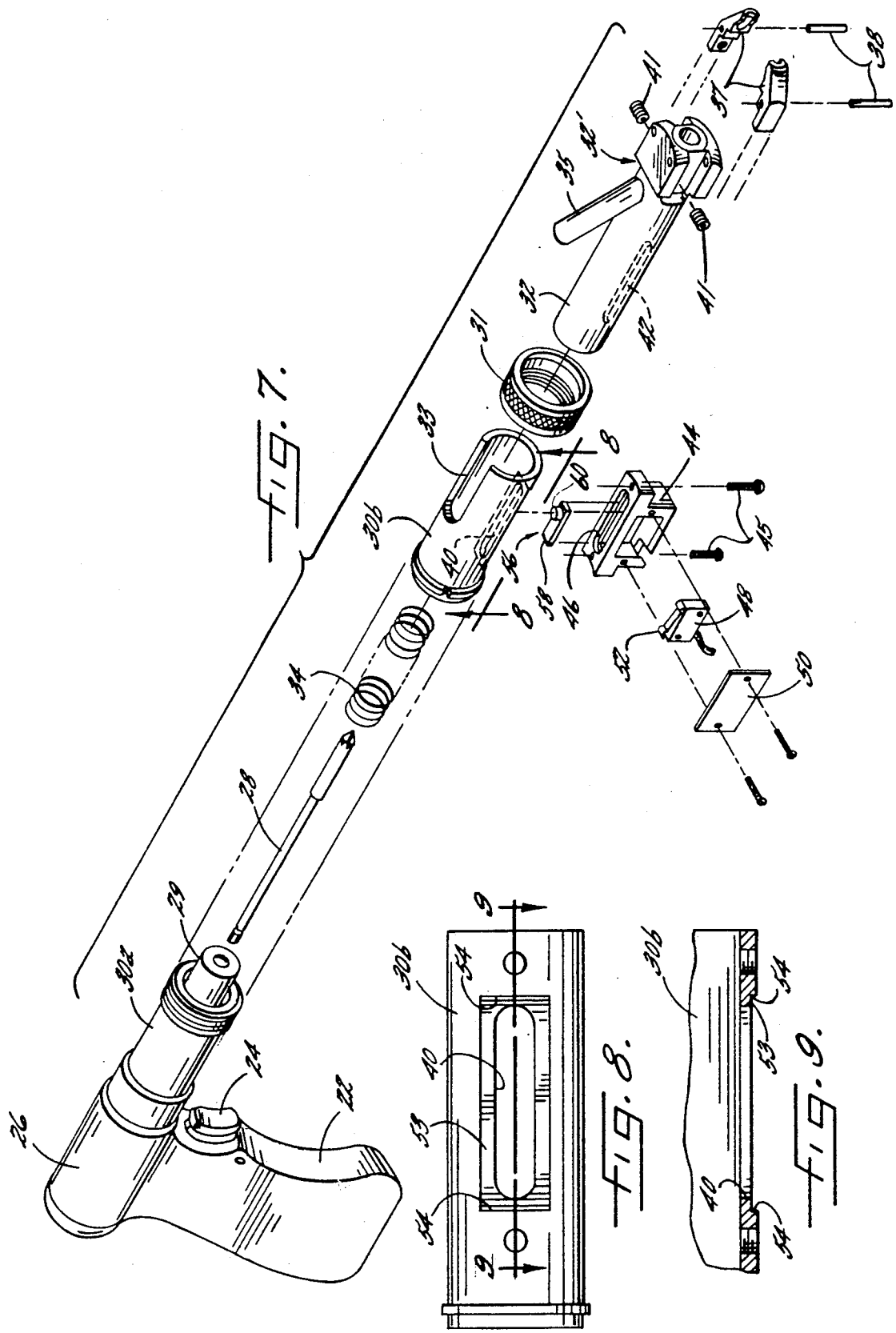

CONTROL MEANS FOR FASTENER DRIVING DEVICE

CROSS REFERENCE TO RELATED APPLICATION

This is a continuation-in-part of copending application Ser. No. 07/260,239 filed Oct. 20, 1988.

FIELD OF THE APPLICATION

This invention relates to a fastener driving apparatus of the type having a fastener driving device into which fasteners are sequentially introduced from a feed assembly or other suitable source. The invention more specifically relates to improved control means for regulating the timing of the introduction of the fasteners into the device, and for also limiting the extent of movement between relatively movable members of the device.

BACKGROUND OF THE INVENTION

Power operated apparatuses for driving fasteners into a workpiece are known in the art. Such an apparatus typically includes a pneumatically powered fastener driving device having a movable barrel member which extends in generally concentric relationship to a fixed barrel member and to a fastener driver member, and that is axially movable relative to them between extreme forward and rearward positions. The device further customarily includes switch-actuating control means for causing fasteners to be introduced at desired times into the movable barrel member of the device. Illustrative fastener driving devices of the aforesaid general type are disclosed in U.S. Pat. Nos. 3,875,982 and 3,946,926.

The control means employed in certain of the prior art fastener driving devices are of unduly complex, expensive and delicate construction. Other prior art devices, such as that of U.S. Pat. No. 3,946,926, have control means of a more durable and less costly type for controlling when fasteners are fed to the device. However, such control means does not perform the additional function of limiting forward and other movement of the movable barrel member of the device, and separate means are provided for that purpose.

SUMMARY OF THE INVENTION

The present invention provides, in a fastener driving device of the above-described type, durable, economical and reliable means for controlling both movements of and the introduction of fasteners into the movable barrel member of the device. The control means includes a control member having an elongate main body section that is mounted adjacent the barrel members for movement parallel to superimposed slots provided within and extending longitudinally of them. The control member further has a stud that projects from the main body section into the barrel slots. The slot/stud interconnection between the barrel members and the control member at times results in movement of the control member in unison with the movable barrel member, and at other times results in the control member remaining stationary while such barrel member undergoes movement, and at still other times results in the control member arresting movement of the barrel member. Movement of the control member between different locations along its path of travel effects actuation and deactuation of switch means that, when actuated, causes fasteners to be introduced into the movable barrel member at desired times during operation of the device.

In the preferred embodiment of the invention the switch means is mounted upon the fixed barrel member by a switch housing, and the means mounting the control member includes a guide track upon the switch housing and a confronting fronting guide track upon the fixed barrel member. Each of the guide tracks preferably has terminal abutment surfaces which are engageable by the control member and which at least assist in arresting longitudinal movement of the control member and the movable barrel member beyond extreme positions thereof. The control member preferably also prevents significant rotation of the movable barrel member about its central axis.

DESCRIPTION OF THE DRAWINGS

Other features of the invention will be apparent from the following description of an illustrative embodiment thereof, which should be read in conjunction with the accompanying drawings, in which:

FIG. 1 is a side elevation view of a fastener driving device in accordance with the invention, and of fastener supply means, some components of which are indicated schematically, associated therewith;

FIG. 2 is an enlarged fragmentary view, primarily in vertical section, of the barrel members and adjacent components of the device;

FIG. 3 is a fragmentary enlarged sectional view, taken substantially along the line 3—3 of FIG. 1, of fastener gripping components of the device;

FIG. 4 is a vertical section taken through the device substantially along the line 4—4 of FIG. 2;

FIG. 5 is an enlarged elevational and sectional view showing the components of the device in the relative positions occupied by them during the driving of a fastener;

FIG. 6 is a view similar to FIG. 5 but showing the components in the positions occupied by them following driving of the fastener, and during introduction of another fastener into the device;

FIG. 7 is an exploded perspective view of components of the device;

FIG. 8 is an enlarged bottom plain view of the forward section of the fixed barrel member of the device; and FIG. 9 is a fragmentary sectional view taken substantially along the line 9—9 of FIG. 8 through the fixed barrel member.

DESCRIPTION OF THE PREFERRED EMBODIMENT

The fastener driving apparatus 10 shown in FIG. 1 includes a powered fastener feeding device 12 that drives fasteners F which are conducted serially to it through a flexible conduit 14 from a suitable source that illustratively includes a vibrating hopper 16 and a fastener feed assembly 18. While they might be of some other type, fasteners F illustratively are conventional screws having slotted beveled heads and threaded shanks.

The structure and operation of the feed hopper 16 and feed assembly 18 are completely illustrated and described in copending parent application Ser. No. 07/260,239, the disclosure of which is expressly incorporated herein by reference.

Device 12 is illustratively pneumatically powered, compressed air being conducted to it by a suitable conduit 20 connected to its handle 22. Actuation of a trigger 24 upon handle 22 energizes a conventional air motor and output chuck (not shown) within rearward housing section 26 of the device. An elongate fastener driver member 28 extends forwardly from the chuck of the air motor and is rotatably driven thereby about its central axis when the motor is energized. The forward end of driver 28 has a conventional configuration suitable for mating engagement with the slotted ends of fasteners F. Also, a retainer sleeve 29 surrounds the chuck for the purposes set forth below.

A fixed tubular barrel member 30, which has two axially aligned sections 30a, 30b releasably interconnected by a coupling 31, extends forwardly from housing 26 in concentric encircling relationship to all but the forward-most portion of driver member 28. More particularly, the coupling 31 includes a shoulder at its forward end for engaging a split ring which is mounted in an annular groove on the section 30b, and the coupling 31 threadly engages threads on the forward end of the section 30a.

A cooperating movable barrel member 32 is slidably and concentrically mounted within fixed barrel member 30 for axial telescoping movement relative to it along an axial path of travel between forwardly extended and rearwardly retracted positions. A coil spring 34 is positioned so as to encircle the driver member 28, with the rearward end thereof engaging the retainer 29 and the forward end engaging the movable barrel member 32. The spring 34 thus biases movable barrel member 32 to its forwardly extended position, shown in FIGS. 1 and 2, while permitting rearward axial movement thereof to its retracted position shown in FIG. 5.

An angularly-extending tubular fastener inlet member 35 of movable barrel member 32 communicates at its outer end with the conduit 14 through which fasteners F are pneumatically conducted at desired times from feed assembly 18 (FIG. 1). The inner end of inlet member 35 communicates with the forward part of the central bore of movable barrel member 32. When barrel 32 occupies its FIG. 5 fully retracted position, the inner end of fastener inlet member 35 is disposed rearwardly of the forward end of driver 28, which then prevents passage of a fastener F from member 35 into the central passageway of movable barrel member 32. Also, the inlet member 35 is then received in an axial slot 33 in the barrel member section 30b. When forward movement of the barrel member causes it to reach its FIG. 6 position, wherein the inner end of fastener inlet member 35 is located forwardly of drive member 28, a fastener F within fastener inlet member 35 may be propelled by compressed air into the central passageway of movable barrel member 32 and thence to a fastener gripping assembly 36, best shown in FIG. 3, mounted upon the enlarged forward end section of 32' of the barrel member. Assembly 36 has a pair of cooperating fastener gripping collets 37 that are pivotally mounted by pins 38 (FIGS. 3 and 7) upon opposite sides of the forward end section 32' of barrel member 32. Semicircular forward end portions of the collets 37 are biased by springs 41 toward engaging positions wherein they define an opening through which passes the shank of each fastener F introduced into barrel 32. Collets 37 and the compressed air within barrel member 32 retain the fastener adjacent the forward end of device 12 while forward movement of the device toward a workpiece WP (FIG. 5) causes such relative telescoping movement of barrel members 30, 32 as to bring driver member 28 and the fastener head into engagement with each other. Actuation of trigger 24 (FIG. 1) and ensuing rotation of member 28 then drives fastener F into workpiece WP (FIGS. 5 and 6). Assembly 36 releases the fastener automatically at such time during the latter stages of the driving operation as the sloping surfaces of the fastener head effect, by a camming action and as is indicated by phantom lines in FIG. 3, pivotal movement of the forward ends of gripping collets 37 away from each other.

Elongate slot-like openings 40, 42 extend through and longitudinally of confronting lower sections of the cylindrical walls of barrel members 30, 32, respectively. The central axes of the slots and of the barrel members lie in a common plane. A housing member 44 is releasably secured, as by means of screws 45, in underlying relationship to that part of fixed barrel member 30 containing slot 40. The upper surface of housing 44 has a concave curvature which is complementary to the convex curvature of the thereby engaged outer surface of barrel member 30. An elongate oval guide track 46 extends longitudinally of and is recessed within the upper portion of housing 44. An opening within the central portion of guide track 46 overlies a control switch means 48 mounted behind a cover plate 50 (FIGS. 1 and 7) within the lower portion of housing 44. A pivotally movable, upwardly-biased actuating lever 52 of switch 48 has a free outer end that projects into the guide track opening unless restrained from doing so. Vertical movement of the free end of lever 52 through the bottom plane of the opening and guide track 46 changes the operating condition of switch 48. When its actuating lever 52 is entirely below such plane, as shown in FIGS. 5 and 6, switch 48 is actuated and causes passage of a fastener F and compressed air through the conduit 14 and member 35 interconnecting feed assembly 18 (FIG. 1) and movable barrel member 32. When the free end of lever 52 is permitted to move above the bottom plane of guide track 46, as shown in FIG. 2, switch 48 is deactuated and terminates the flow of compressed air into and through conduit 14 and member 35.

A second guide track 53, best shown in FIGS. 8 and 9, is provided upon that part of the undersurface of barrel member 30 through which slot 40 extends. Guide track 53 surrounds slot 40 and at its opposite ends has shoulder-like stop surfaces 54 that extend perpendicularly to the flat main part of the guide track.

Control means in the form of a control member 56 is mounted by the guide tracks 46, 53 for limited movement parallel to the central axes of the tracks and of barrel slots 40, 42. More particularly, the control member 56 is movable with respect to the slot 40 and the housing 44 between a rearward position as seen in FIG. 5 and a forward position as seen in FIG. 2. Control member 56 has an elongate plate-like main body section or element 58, and a stud 60 that projects upwardly from body 58 adjacent the forward end thereof. The horizontal expanse of guide track 46 engages and supports undersurface edge portions of plate-like body 58. The vertical side portions of guide track 46 engage, and constrain lateral movement of the adjacent opposite sides of the body. Opposite side portions of the upper surface of body 58 are closely adjacent to, and may be in engagement with, the overlying guide track 53 upon fixed barrel member 30. The stud 60 of control member 56 projects through slots 40, 42 of barrel members 30, 32, and has a diameter only slightly less than the width of such slots. Among other functions, therefore, control member 56 prevents significant rotative movement of barrel members 30, 32 relative to each other.

Control member 56 also prevents movement of barrel member 32 beyond its extreme forward and rearward positions of FIGS. 2 and 5, respectively. Forward movement of barrel member 32 beyond its FIG. 2 position is prevented by then occurring abutment of stud 60 with the forward end of fixed barrel slot 40 and the rearward end of movable barrel slot 42; and by substantially simultaneous engagement of the forward end of body 58 of member 56 with the forwardmost shoulder-like stop surface 54 of guide track 53. Rearward movement of barrel member 3 beyond its FIG. 5 position is halted by the engagement that then occurs between the rear end of control member 56 and the rearmost stop surface 54 of guide track 53, and by the engagement between the stud 60 and the forward end of the slot 42 in the movable barrel member.

Control member 56 additionally automatically controls actuation of switch 48, and thus the timing of the introduction of fasteners F into the forward end portion of movable barrel member 32. When device 12 is driving a fastener F, the then fully retracted position of barrel member 32 causes control member 56 to occupy its FIG. 5 rearward position. Its body 58 then overlies and depresses the free end of actuator lever 52, and thereby maintains switch 48 in an actuated condition wherein it causes feed assembly 18 (FIG. 1) to direct compressed air and another fastener F to device 12 through conduit 14 and member 35. As device 12 is moved rearwardly following driving of the fastener, spring 34 advances barrel member 32 forwardly until the inner end of fastener inlet member 35 clears the forward end of driver member 28, as shown in FIG. 6. At that time, the fastener F previously introduced into inlet member 35 is conducted by the then still-continuing air flow from member 35 into the forward end portion of barrel member 32, since switch lever 52 is then still depressed by control member body 58. However, as barrel member 32 continues its forward movement, engagement between the rear end of its slot 42 and the stud 60 of member 58 moves the latter sufficiently forwardly as to permit upward movement of the outer end of lever 52 through the bottom plane of guide track 46 and control member 56. This occurs when barrel member 32 reaches an intermediate position closely adjacent that of FIG. 6. As is indicated in FIG. 2, the resulting deactuation of switch 48 suspends the passage of air and an additional fastener into device 12 until rearward movement of barrel member 32 again causes the inner end of inlet member 35 to overlie driver member 28, and again causes control member 56 to depress switch lever 52.

To summarize the operation of the apparatus, a fastener will be initially in position in the collets 37, and the barrel member 32 will be forwardly extended, in the position of FIG. 2. The operator then activates the apparatus by pressing the fastener in the collets 37 against the workpiece WP, so as to cause the barrel member 32 to slide rearwardly into the fixed barrel member 30. The operator also closes the trigger 24, which activates the drive motor and rotates the driver 28. Upon the barrel member 32 moving rearwardly to an intermediate position, the free end of the lever 52 is engaged by the control member 56 so as to close the switch 48, which in turn activates the feed device 18 to feed another fastener into the conduit 14 where it engages the driver member 28 and is thus held for the moment. However, air continues to be fed into the conduit 14 from the assembly 18. When the screw is fully driven into the workpiece WP, the device 12 is manually withdrawn from the workpiece WP, and the barrel member 30 is moved forwardly by the action of the spring 34. The switch 48 remains closed during about the first half of this forward movement so that the air feed remains on and the fastener in the conduit 14 is fed into the collets when the driver 28 recedes with respect to the barrel member 30. The control member 56 is then moved forwardly by engagement between the stud 60 and the rear end of the slot 42, note FIG. 6, so as to disengage the switch 48 and turn off the air supply during the remainder of the forward movement of the barrel member 32. The cycle may then be repeated.

While a specific embodiment of the invention has been shown and described, this was for purposes of illustration only, and not for purposes of limitation, the scope of the invention being in accordance with the following claims.

That which is claimed is:

1. A fastener driving device, comprising:
    an elongate driver member having a forward end adapted to engage and impart driving forces to a fastener;
    a fixed barrel member and a movable barrel member extending in generally concentric relationship to each other and to said driver member, with each of said barrel members having a longitudinally extending slot intermediate the length thereof, and with said slots being radially aligned, said movable barrel member being movable forwardly and rearwardly relative to said fixed barrel member and said driver member along a path of travel between longitudinally spaced forward and rearward terminal positions and through an intermediate position, said movable barrel member having a fastener inlet opening intermediate its length, said opening being adjacent said forward end of said drive member when said movable barrel member occupies said intermediate position thereof;
    switch means for when actuated causing a fastener propelling flow of air to be directed into said movable barrel member through said inlet opening thereof;
    control means mounted adjacent said barrel members and said switch means and including a stud projecting radially into both of said slots for, during operation of said fastener driving device,
    (a) actuating said switch means when said movable barrel member is in a rearward portion of said path of travel,
    (b) deactuating said switch means when said movable barrel member is in a forward portion of said path of travel, and
    (c) limiting rotative movement of said barrel members relative to each other.

2. A device as in claim 1, wherein said control means includes a control member having an elongate plate-like main section and with said stud projecting from said main section adjacent one end thereof.

3. A device as in claim 2, and further including mounting means mounting said main section of said control member adjacent said fixed barrel member and said slots, said mounting means including a guide track surrounding said slot of said fixed barrel member and having abutment surfaces at opposite ends thereof, said main section of said control member being in closely adjacent parallel relationship to said guide track and being movable longitudinally thereof into and out of engagement with said abutment surfaces.

4. A device as in claim 3, wherein said mounting means includes a second guide track supportively engaging said main section of said control member on a side thereof opposite from said first-mentioned guide track.

5. A device as in claim 4, and further including a housing carried by said fixed barrel member adjacent said slot therein, said second guide track being upon said housing and having a central opening therein, said switch means being carried by said housing and having a movable actuating lever adjacent said opening of said second guide track and the path of longitudinal movement of said control member.

6. A fastener driving device, comprising:
a manually grippable handle mounting a drive motor,
an elongate driver member having a rear end connected to said drive motor and a forward end adapted to engage and impart driving forces to a fastener,
a first barrel member fixed to said housing and coaxially surrounding at least a portion of the length of said driver member,
a movable second movable barrel member extending in generally concentric telescoping relation to said first barrel member, said moveable barrel member being movable forwardly and rearwardly relative to said first barrel member and said driver member along a path of travel between longitudinally spaced forward and rearward terminal positions and through an intermediate position, said movable barrel member having a fastener inlet opening intermediate its length, said opening being adjacent said forward end of said driver member when said moveable barrel member occupies said intermediate position thereof,
said first and second barrel members each having a longitudinally extending slot intermediate the length thereof, and with said slots being radially aligned,
a housing mounted to said first barrel member so as to overlie the slot therein,
switch means mounted in said housing for when actuated causing a fastener propelling flow of air to be directed into said movable barrel member through said inlet opening thereof, and
control means for selectively actuating said switch means and comprising a control member mounted between said first barrel member and said housing, with said control member including a stud projecting radially into both of said slots, and with said control member being axially movable with respect to said slot of said first barrel member between a rearward position wherein said switch means is actuated and a forward position wherein said switch means is not actuated, and with said slot of said movable barrel member being of a length such that said control member is moved to said rearward position when said movable barrel member has moved rearwardly and is adjacent said intermediate position thereof and said control member is moved to said forward position when said movable barrel member has moved forwardly and is adjacent said intermediate position thereof.

7. A device as in claim 6 further comprising spring means mounted coaxially about said driver member and within said barrel members for biasing said movable barrel member toward said forward terminal position.

8. A device as in claim 7 wherein said movable barrel member further includes spring biased collet means for retaining a fastener at the forward end thereof.

9. A device as in claim 8 wherein said handle mounts a trigger for selectively operating said drive motor.

10. A device as in claim 6 wherein said driver member has a length such that said forward end thereof overlies and closes said fastener inlet opening of said movable barrel member when said movable barrel member has moved rearwardly and has moved said control member to said rearward position thereof, and said forward end of said driver member is retracted from said inlet opening when said movable barrel member reaches said forward terminal position thereof.

* * * * *

UNITED STATES PATENT AND TRADEMARK OFFICE
CERTIFICATE OF CORRECTION

PATENT NO. : 5,031,489

DATED : July 16, 1991

INVENTOR(S) : Alfred (NMI) Young and Fred E. Church

It is certified that error appears in the above-identified patent and that said Letters Patent is hereby corrected as shown below:

Column 2, line 7, delete "fronting"

Column 5, line 15, "3" should be -- 32 --

Signed and Sealed this

Twenty-second Day of December, 1992

Attest:

DOUGLAS B. COMER

Attesting Officer

Acting Commissioner of Patents and Trademarks